No. 858,400. PATENTED JULY 2, 1907.
F. VON KÜGELGEN & G. O. SEWARD.
ELECTRIC FURNACE PROCESS.
APPLICATION FILED JAN. 31, 1905.
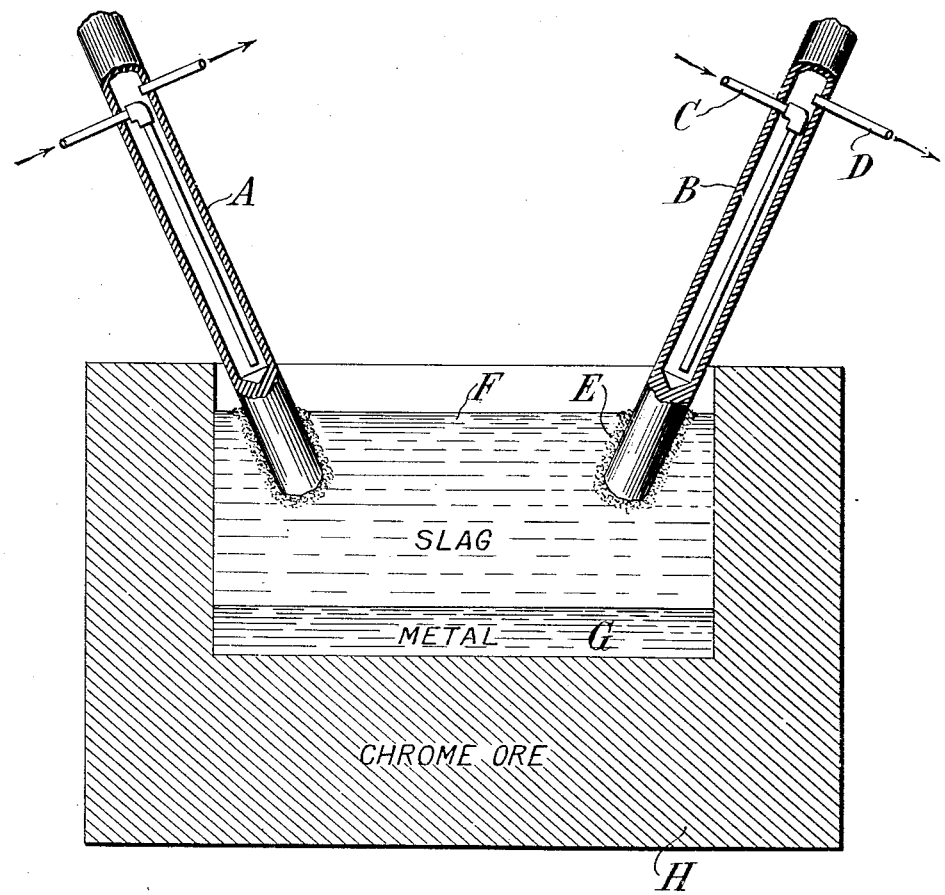
WITNESSES:
INVENTORS:
Franz Von Kügelgen and George O. Seward
By Attorneys,

UNITED STATES PATENT OFFICE.

FRANZ VON KÜGELGEN AND GEORGE O. SEWARD, OF HOLCOMBS ROCK, VIRGINIA.

ELECTRIC-FURNACE PROCESS.

No. 858,400. Specification of Letters Patent. Patented July 2, 1907.

Application filed January 31, 1905. Serial No. 243,494.

*To all whom it may concern:*

Be it known that we, FRANZ VON KÜGELGEN, a subject of the German Emperor, and GEORGE O. SEWARD, a citizen of the United States, both residing at Holcombs Rock, in the county of Bedford and State of Virginia, have jointly invented certain new and useful Improvements in Electric-Furnace Processes, of which the following is a specification.

The present invention is designed especially for the production of low carbon and carbon-free metals, such, for example, as chromium, tungsten, and molybdenum, or alloys of metals (especially alloys with iron). The invention is also of use in a wider field including a great number of electric furnace, electrolytic, and other operations.

The invention is applicable to those electric furnace or electrolytic operations wherein a pyro-conductive charge is maintained molten by the passage through it of a sufficient electric current. At least one electrode is in contact with such charge, which thus forms a fluid resistance. In the production of low-carbon or carbon-free metals or alloys, this pyro-conductive charge consists of a bath of molten oxidizing or decarburizing slag.

Electric furnaces produce usually an intense heat, and the only materials which have been found capable of withstanding this heat and of practical utilization as electrodes are carbon and graphite. Whenever carbon or graphite electrodes or pencils are used, it has been found impossible to prevent a portion of the carbon from combining with the charge. Even when the electrodes plunge into the charge or slag above the metal, not touching the latter at all, and even when there is no contact between the electrodes and the charge (an arc being maintained) more or less carbon from the electrodes is conveyed to the metal. The slag always contains oxids of the metal to be produced or refined, and these oxids are reduced by the carbon from the electrodes to a carbid, the latter falling to the bottom and alloying with the metal there. To avoid this difficulty the Colby and Kjellin induction furnaces have been proposed, and the well known Moissan arch furnace, but these are expensive to construct and the watt efficiency is generally low.

Most oxids, mixtures of oxids, salts and slags are pyroconductors, being non-conductive or nearly so when cold and displaying a considerable conductivity only when they are heated to certain temperatures. According to the present invention one or more of the electrodes is cooled by extraneous means, and this cooling has certain valuable advantages. Where a pyro-conductive charge is maintained in a molten state by its resistance to the passage of the current, the electrodes may be maintained at a temperature below their melting point (as, for example, by water-cooling arrangements), and thus carbon-free, preferably metallic, electrodes may be used where this has been previously impossible. With a pyro-conductive charge the material of the electrodes must be such as has a higher melting point than the temperature at which the charge becomes conductive, so that the portion of the charge in contact with or immediately surrounding the electrode may be kept at so low a temperature that it will not materially attack or melt the electrode, and yet so high that it will remain suitably conductive to the passage of the current from the electrodes to the hotter working portion of the charge. By the "working portion" of the charge we mean that part of the charge remote enough from the cooling effect of the electrodes to be maintained, by its resistance to the passage of the current, at a temperature sufficiently high to bring about the reactions desired. This working portion of the charge will in all cases be at a higher temperature than the portions surrounding the electrodes. It is to be observed that with the cooled electrodes referred to the charge must be such as to display a suitable conductivity at the temperature at which the electrodes remain solid; otherwise the portion of the charge in contact with the electrodes would not conduct away the current to the working portion of the charge. The contact area of the cooled electrode should also be so large as to avoid arcing and to insure that the resistance of the charge is practically the sole cause of heating. The material of the electrodes may be a metal, as iron, which melts at a temperature far below the melting point of the charge. It is only necessary, as stated above, that the charge shall be suitably conductive at the temperature of the solid electrodes, no matter how far this temperature may be below that of the working portion of the charge.

The condition of the charge in contact with and immediately surrounding the electrode will depend upon the relation between the melting point of the charge and that of the electrode respectively. The electrode being solid, the charge in contact with the electrode will in some cases be molten, in some cases solid, and in other cases passing through various degrees of pastiness. Where the charge has a lower melting point than the electrode it would be in a molten state around the electrode. If, however, the charge has a higher melting point than the electrode, then the latter has to be cooled to such an extent that the charge in proximity thereto is reduced to a pasty or solid (but still conductive) state. In the last case the chilled portion of the charge in contact with the original electrode forms a conductive coating thereon and becomes the working electrode the water-cooled electrode then serving merely as a conductor to the working portions of the charge.

Even where it is not necessary for the maintenance of the solidity of the electrode, it may be found desirable to lower the temperature of the latter to such a point as to cause the formation of the working electrode above described out of the material properly constituting the charge. By this method, the electrodes are made practically indestructible, thus reducing the cost and increasing the efficiency of the process for various purposes.

This process may be very well used in electrolysis of molten electrolytes. Here it is ordinarily impossible to use a metallic electrode because of the electrolytic and chemical action upon the electrodes. But, by cooling a metallic electrode sufficiently to congeal upon its contact surface a portion of the conductive material of the electrolyte, the original electrode would be perfectly protected by the working electrode thus formed.

The slags ordinarily used as the charges for electric resistance furnaces are poor heat conductors; therefore heat is transmitted comparatively slowly to the electrode, and it is not necessary to apply the cooling process very vigorously in order to maintain the electrode solid.

As a specific example we will describe the application of the process to the refining of ferro-chrome containing originally a high percentage of carbon,—say six to eight per cent. A crucible is made of carbon-free materials, such, for example, as chrome ore. The charge is made up of a refining slag of chrome ore and lime, under which the metal to be refined is melted. The charge is first melted by temporary carbon electrodes. These are used for so short a time as to introduce only a negligible quantity of carbon. Then water-cooled steel pencils or electrodes are introduced into the molten charge. The temperature of that portion of the charge in contact with the pencil is reduced to a point so low that it will not materially attack or melt the pencil. The current passes from one pencil to the slag and thence to the other pencil and the metal at the bottom of the crucible is gradually refined by the action of the oxid slag on the carbon of the metal. The charge must, of course, be so arranged and must be maintained of such dimensions that it will offer a sufficient resistance to produce the necessary temperature for the reaction.

The accompanying drawing illustrates the described operation.

The electrodes A and B constitute the terminals of, preferably, an alternating current electric circuit, and are water cooled to a point sufficiently near the immersed portion. The cooled portions of the charge around the ends of electrodes A and B are indicated by E E, the slag by F, and the metal undergoing refining by G. H is the crucible of substantially carbon-free material, such, for example, as chrome ore. Though we have shown in this illustrative example both poles plunged into the charge from above, and both electrodes of opposite polarity cooled, we do not confine ourselves to this arrangement. In many cases it may be found just as desirable, or more so, to constitute the metal underlying the charge one pole of the furnace, and the other pole made up of one or more electrodes as described. The invention therefore embraces the application of the improvement to one or two or in fact to any number of electrodes.

By a "pyro-conductive" charge we mean one of material which when cold is a non-conductor of electricity, or substantially so, and becomes an effective conductor only when heated to a high temperature, either to fusion or to an approach to the fusing point.

Though we have described with great particularity of detail certain specific apparatus and processes embodying the invention, yet it is not to be understood therefrom that the use of the invention is limited to the exact processes and apparatus described.

Various modifications in the arrangement and combination of the parts and in the material and steps of the process may be made by those skilled in the art without departure from the invention.

What we claim is:—

1. The method which consists in treating in an electric furnace a pyro-conductive charge by passing through it from a solid electrode in contact with it, a current sufficient to maintain the charge molten, and cooling said electrode sufficiently to protect it from attack by the molten charge.

2. The method which consists in treating in an electric furnace a pyro-conductive charge by passing through it from a solid electrode in contact with it, a current sufficient to maintain the working portion of the charge molten, and cooling said electrode sufficiently to cause a portion of the charge to be chilled in a protective but conducting coating thereon.

3. The method which consists in treating in an electric furnace a pyro-conductive charge by passing a current through it from a metallic electrode in contact with it, the melting point of which electrode is lower than the working temperature of the charge, and said current being sufficient to maintain the charge molten, and cooling said electrode sufficiently to protect it from being fused by the portion of the charge in contact with it.

4. The method of electric furnace treatment which consists in maintaining a molten metallic bath and above it a molten pyro-electric charge, keeping the latter molten by passing through it a sufficient current between electrodes one (at least) of which is in contact with it, but not in contact with the metallic bath, and cooling said electrode sufficiently to protect it from attack by said molten charge.

5. The method which consists in electrolyzing a pyro-conductive electrolyte by passing through it from a solid electrode in contact with it, a current sufficient to maintain the electrolyte molten, and cooling said electrode sufficiently to cause a portion of the electrolyte to be chilled in a protective but conducting coating thereon whereby such chilled portion becomes the working electrode.

In witness whereof, we have hereunto signed our names in the presence of two subscribing witnesses.

FRANZ VON KÜGELGEN.
GEORGE O. SEWARD.

Witnesses:
E. F. SCALES, Jr.,
JNO. B. HUFFARD.